United States Patent [19]

Das et al.

[11] Patent Number: 5,126,412
[45] Date of Patent: * Jun. 30, 1992

[54] CYANATO GROUP CONTAINING PHENOLIC RESINS, AND PHENOLIC TRIAZINES DERIVED THEREFROM

[75] Inventors: Sajal Das, Basking Ridge; Dusan C. Prevorsek, Morristown, both of N.J.

[73] Assignee: Allied-Signal Inc., Morristown, N.J.

[*] Notice: The portion of the term of this patent subsequent to May 16, 2006 has been disclaimed.

[21] Appl. No.: 578,169

[22] Filed: Sep. 6, 1990

Related U.S. Application Data

[63] Continuation-in-part of Ser. No. 271,198, Jan. 15, 1988, Pat. No. 4,978,727, which is a continuation-in-part of Ser. No. 41,018, Mar. 23, 1987, abandoned, which is a continuation-in-part of Ser. No. 821,658, Jan. 23, 1989, abandoned, and a continuation-in-part of Ser. No. 104,700, Oct. 5, 1987, Pat. No. 4,831,086.

[51] Int. Cl.$^5$ .................. C08G 8/28; C08G 14/06
[52] U.S. Cl. .................... 525/504; 528/162
[58] Field of Search .............. 525/504; 528/162

[56] References Cited

U.S. PATENT DOCUMENTS

| | | | |
|---|---|---|---|
| 3,444,137 | 5/1969 | Higginbottom et al. | 525/504 |
| 3,448,079 | 6/1969 | Grigat et al. | 525/504 |
| 3,890,272 | 6/1975 | D'Alelio | 528/162 |
| 3,929,713 | 12/1975 | D'Alelio | 528/162 |
| 3,966,670 | 6/1976 | Grazen et al. | 528/129 |
| 4,022,755 | 5/1977 | Tanigaichi et al. | 525/504 |
| 4,096,108 | 6/1978 | Webb et al. | 528/129 |
| 4,118,377 | 10/1978 | D'Alelio | 528/162 |
| 4,157,360 | 5/1979 | Prevorsek et al. | 528/125 |
| 4,218,361 | 8/1980 | Searjean et al. | 528/129 |
| 4,219,452 | 8/1980 | Littlefield | 528/129 |
| 4,268,657 | 5/1981 | Manzara et al. | 528/129 |
| 4,281,361 | 7/1981 | Patz et al. | 528/129 |
| 4,477,629 | 10/1984 | Hefner | 528/99 |
| 4,487,915 | 12/1984 | Hefner | 528/96 |
| 4,528,366 | 7/1985 | Woo et al. | 528/422 |
| 4,713,442 | 12/1987 | Woo et al. | 528/422 |
| 4,831,086 | 5/1989 | Das et al. | 525/504 |

FOREIGN PATENT DOCUMENTS

| | | |
|---|---|---|
| 0180649 | 10/1984 | European Pat. Off. |
| 147548 | 7/1985 | European Pat. Off. |
| 1094453 | 2/1959 | Fed. Rep. of Germany |
| 1251023 | 5/1965 | Fed. Rep. of Germany |
| 1720740 | 9/1971 | Fed. Rep. of Germany |
| 2533322 | 2/1976 | Fed. Rep. of Germany |
| WO88/05443 | 7/1988 | Int'l Pat. Institute |
| WO91/03507 | 3/1991 | Int'l Pat. Institute |
| 58-34822 | 3/1983 | Japan |
| 59-149918 | 8/1984 | Japan |
| 1174654 | 8/1986 | Japan |
| 8503713 | 8/1985 | World Int. Prop. O. |
| 8704443 | 7/1987 | World Int. Prop. O. |

OTHER PUBLICATIONS

Kunstoffe, Bd, 58, pp. 827-832 (1968) by R. Kubens et al.
Dokl. and Adak, Nauk SSSR, vol. 202, pp. 347-350 (1972) by V. V. Kovhak et al.

*Primary Examiner*—John C. Bleutge
*Assistant Examiner*—Frederick Krass
*Attorney, Agent, or Firm*—R. C. Stewart, II; G. H. Fuchs; D. L. Webster

[57] ABSTRACT

The present invention is a cyanato group containing phenolic resin, and to phenolic triazine resins derived therefrom. The resin of the present invention is stable and has a long shelf life. This is indicated by the gel time of greater than 3 minutes and by a shelf life equal to or greater than 3 days.

45 Claims, No Drawings

CYANATO GROUP CONTAINING PHENOLIC RESINS, AND PHENOLIC TRIAZINES DERIVED THEREFROM

RELATED APPLICATIONS

This application is a continuation-in-part application of U.S. patent application Ser. No. 271,198 filed Jan. 15, 1988 now U.S. Pat. No. 4,978,727 which is a continuation-in-part application of U.S. patent application 041,018 filed Mar. 23, 1987 now abandoned claiming priority of PCT/US87/00123 filed Jan. 15, 1987, which is a continuation-in-part of U.S. patent application Ser. No. 821,658, filed Jan. 23, 1986, now abandoned; and U.S. patent Ser. No. 104,700 filed on Oct. 5, 1987 now U.S. Pat. No. 4,831,086.

BACKGROUND OF THE INVENTION

1. Field of the Invention

This invention relates to certain novel cyanato group containing phenolic resins, also known as phenolic cyanate resin and to a process of preparing same. More Particularly, this invention relates to such resins which have improved properties and to a process for preparing such resins.

2. Prior Art

Phenolic resins are a class of synthetic materials that have grown continuously in terms of volume and applications for over several decades. The building blocks used in greatest volume are phenol and formaldehyde. Other important phenolic starting materials are the alkyl-substituted phenols, including cresols, xylenols, p-tert-butyl-phenol, p-phenylphenol, and nonylphenol. Diphenols, e.g., resorcinol (1,3-benzenediol) and bisphenol-A [bis-A or 2,2-bis(4-hydroxylphenyl)propane], are employed in smaller quantities for applications requiring special properties. In addition to formaldehyde, acetaldehyde or furfuraldehyde sometimes are employed but in much smaller quantities. The greater latitude in molecular structure, which is provided by varying the raw materials, chemistry, and manufacturing process, has made possible an extremely large number of applications for these products as a result of the array of physical properties that arise from the synthetic options.

The early investigation of the reaction of phenol and formaldehyde began with the work of von Baeyer and others in the early 1870's as an extension of phenol based dye chemistry. The initial experiments result in soluble, amorphous products whose properties elicited little interest. Insoluble, cross-linked products also were reported in the late 1880's, but these products also were not perceived as useful materials. In 1888, the first patent for a phenolic-resin product intended for use as a hard-rubber substitute was granted. The first commercial product was introduced as a shellac substitute by the Louis Bluner Company in the early 1900's. Process patents were issued in 1894 and 1895 for ortho- and para-methylolphenol, respectively.

Key innovations in early phenolic-resin manufacture included control of the molecular structure and the use of heat and pressure to achieve desirable physical properties in filled compositions. Studies in the use of acidic or basic catalysts and of changes in the molar ratio of formaldehyde to Phenol resulted in the definition of two classes of polymeric materials which are referred to as Bakelite resins. Caustic-catalyzed products, which are prepared with greater than a 1:1 mol ratio of formaldehyde to phenol, can be used to form cross-linked, insoluble, and infusible compositions in a controlled fashion. With less than a 1:1 mol ratio of formaldehyde to phenol, the resultant products remain soluble; furthermore, acid catalysis yields permanently stable compositions, whereas base-catalyzed materials can be advanced in molecular weight and viscosity. Possibly of greatest importance to early commercialization, however, was the reduction to practice of the use of heat and pressure to produce essentially void-free molding compositions.

Resole resins are made with an alkaline catalyst and a molar excess of formaldehyde. Novolak or novolac resins are prepared with an acid catalyst and less than one mol of formaldehyde per mol of phenol. The initial reaction involved in the preparation of resolated novolacs is carried out with an acid catalyst and less than a 1:1 mol ratio of formaldehyde to Phenol. After formation of the novolac, the PH is adjusted so that the reaction mixture is basic and additional formaldehyde is added. Resoles and resolated novolaks are inherently thermosetting and require no curing agent for advancement. Novolacs, by comparison, are thermoplastic and require the addition of a curing agent, the most common being either hexamethylene-tetramine or a resole. The stages of molecular weight advancement are characterized by liquid or solid phenolic polymer which is soluble in certain organic solvents and is fusible; solid resin which is insoluble but swelled by organic solvents and, although softened by heat, exhibits essentially no flow; and an insoluble, infusible product which is not swelled by solvents nor softened by heat, i.e., the system is in a highly cross-linked state.

Phenolic resins have many uses. For example, such materials are used as bonding agents in friction materials such as brake linings, clutch facings, transmission bonds and the like. For example, U.S. Pat. Nos. 4,268,157; 4,069,108: 4.268,657; 4,218,361; 4,219,452 and 3,966,670 describe various friction materials in which a phenolic resin is employed as the bonding agent. Phenolics are also used as molding materials, and as coatings and adhesives. Phenolic resins developed for non-flammability and long-term temperature stability to 230° C. have been studied in a carbon-fiber composites. Potential for such composites lies in advanced aircraft application.

While present day phenolics exhibit several beneficial properties, they suffer from a number of disadvantages which restrict their utility. For example, such materials exhibit less than desirable thermal oxidative stability. Other major problems of present day phenolic technology include a need for auxiliary chemicals such as hexamethylenetetramine to crosslink the Phenolic which often results in the production of volatile by-Products such as ammonia during crosslinking is often extensive and is not controllable.

Various modifications to phenolics have been proposed to obviate certain of the disadvantages attendant to these resins. For example, epichlorohydrin has been reacted with the hydroxyl groups of novolac to form the corresponding form methylon resin.

Japanese Patent Publications Nos. 59-149918, and 58-34822 describe a method of preparing a phenolic resin containing cyanate groups. In this method, a trialkyl ammonium salt of a phenol novolak is reacted with excess cyano halogen in an organic solvent such as methylene chloride. The ammonium by-product salt is separated from the reaction mixture by extraction with water. Several disadvantages are attendant to the process of these references. The reaction is limited to being conducted in a water immiscible solvent. As a result it is suitable only for cyanation of low molecular weight novolac resin below 320 Mn. We have found that the method disclosed in these references results in a phenolic cyanate resin which release smoke (volatiles) during curing at 155° C. or above.

U.S. Pat. No. 3,448,079 describes aromatic cyanic acid esters produced by the reaction of phenolic resins with cyanogen halide in which the hydroxyl groups of the phenol-formaldehyde resins are replaced with cyanic acid ester groups, and process for producing same. U.S. Pat. No. 3,444,137 describes curable phenol-aldehyde resins characterized by molecules which contain a cyano group, an amine nitrogen atom, a phenyl group and a substituted hydroxyl group, such molecules having been made by reacting a phenol, formaldehyde and a cyano substituted primary or secondary amine. U.S. Pat. No. 4,022,755 describes cyanato-group containing phenol resins, and a process for preparing same. U.S. Pat. No. 4,713,442 discloses a polytriazine which comprises 1,3,5-triaryloxytriazines. Polyaromatic cyanates are also disclosed in EPA 0 147 548, WO 85/03713 and GB-A-1218447.

Cyanato group containing phenolic resins have been described in Delano, et al., *Synthesis of Improved Phenolic Resins*, Acurex Corp./Aerotherm, Acurex Vinyl Report 79-25/AS, Sep. 4, 1979, prepared for NASA Lewis Research Center, Contract No. Nas3-21368, and is available through the United States Department of Commerce National Technical Information Service.

A recent reference, "Heat Resistance Polymers" by Critchley, et al., pp. 406-408, Plenum Press, New York, 1986, has described phenolic triazine resins prepared from phenolic novolac or meta-cresol novolac which have essentially the same chemical structures as described in the above referenced patents. As disclosed in this reference, while the phenolic triazines which have been disclosed have been found to have high thermal stability, they have heretofore not been commercially produced because of relatively poor shelf life.

SUMMARY OF THE INVENTION

The present invention is directed to a modified phenolic cyanate resin of the Formula:

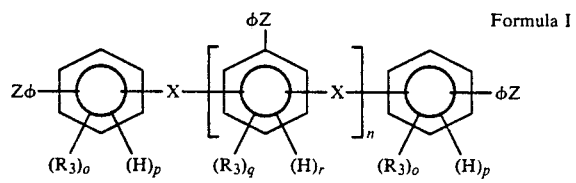

Formula I wherein:

n is 0 or a positive whole number greater than or equal to 1;

q and r are the same or different at each occurrence and are whole numbers from 0 to 3, with the proviso that the sum of q and r at each occurrence is equal to 3;

—Z is —O$(R)_y$CN or —OH and —O$(R)_y$CN;

y is the same or different at each occurrence and is 0 or 1;

o and p are the same or different at each occurrence and are whole numbers from 0 to 4 with the proviso that the sum of o and p at each occurrence is equal to 4;

—R— is a divalent organic radical;

—X— is a divalent radical which is substituted to the phenyl group at the Para position, or at the para and ortho positions, or at the meta and ortho positions or at the meta and para positions, or at the meta positions with respect to the —Z groups of the phenyl moiety such that the mole percent of ortho substitution is less than about 76% based on the total moles of phenyl moieties substituted to the —X— moiety; preferably less than about 75%, more preferably from about 40% to about 75%; and most preferably from about 45% to about 70%;

$R_3$ is the same or different at each occurrence and is a substituent other than hydrogen, said resin having a shelf life of more than about 3 days, preferably of more than about 14 days and more preferably of more than about 21 days, with those embodiments having a shelf life of at least about 90 days being the embodiment of choice. As used herein, "shelf life" is the period over which a 20 gram sample of the resin can be stored at a temperature of about 20° C. without conversion of more than about 20 wt % of the resin (based on the total weight of the stored resin) into components which are insoluble at about 20° C. in a 100g sample of methylene chloride or tetrahydrofuran.

The resin of the present invention is processable using conventional plastic processing equipment and has a relatively long shelf life. This is indicated by a gel-time of greater than about 3 minutes, preferably greater than about 10 minutes, more preferably greater than about 20 minutes and most preferably greater than about 30 minutes at 155° C. This is also indicated by relatively superior shelf life of at least about 3 days, preferably at least about 14 days, more preferably of at least about 21 days and most preferably of at least about 90 days.

The improved phenolic cyanate resin of the present invention can react in a cyclotrimerization reaction to form a phenolic triazine characterized as having a relatively high thermal stability as indicated by a thermal decomposition temperature of at least about 400° C. and preferably of at least about 450° C. as measured by Thermal Gravimetric Analysis (TGA), and having an enchanced char yield of at least about 50 wt % based on the original weight of the phenolic triazine, preferably from about 50 about 70 wt %, and more preferably from about 60 about 70 wt % also as measured by Thermal Gravimetric Analysis (TGA).

This invention also relates to partially cured, completely cured and incompletely cured compositions formed by "cyclotrimerization" of the cyano group of the modified phenolic resin of Formula I to varying degrees, and such compositions formed by reaction of the cyano groups modified resin of Formula I with a suitable bismaleimide to varying degrees. As used herein, "completely cured" modified phenolic resins are those in which less than about 20 mole percent of the original cyano groups remain unreacted, i.e. uncyclotrimerized, as determined by the method of infrared spectrophotometry; "partially cured" modified phenolic resins are those in which from about 40 to about 80 mole percent of the original cyano groups are unreacted, i.e. uncyclotrimerized, as determined by infrared spectrophotometry; and "incompletely cured" modified phenolic resins are those in which from about 20 mole percent to up to less than about 40 mole percent of the original cyano groups are unreacted, i.e. uncyclotrimerized, as determined by infrared spectrophotometry.

Still, another aspect of this invention relates to precured, partially cured, incompletely cured and completely cured compositions comprising the modified phenolic resin of Formula I having varying degrees of cyclotrimerization in admixture with one or more other materials as for example, blends with one or more thermosetting resins, one or more thermoplastic polymers or mixtures thereof such as epoxies, phenolic, polyamides, alkyds, polyester, polycarbonates, polyetherimides, polysulfones, polyether ether ketones, polyphenylenesulfides, polybenza imidazoles, polyolefins and the like and/or filled with particulate and fibrous inorganic or organic fillers as for example asbestos, glass, mica, boron, carbon, and the like.

The cured resin derived from the modified phenolic resin of this invention, and the modified phenolic resin of this invention exhibit several advantages over conventional phenolic resins. For example, certain of these materials are self crosslinking, and thus do not require auxiliary chemicals for crosslinking. Moreover, the cross-linked, i.e. cured, resins of this invention have excellent oxidative, mechanical and thermal stability, and no volatile, potentially environmentally hazardous by-products are produced during crosslinking.

DESCRIPTION OF THE PREFERRED EMBODIMENTS

One aspect of this invention relates to a phenolic cyanate having relatively enhanced shelf life of the formula:

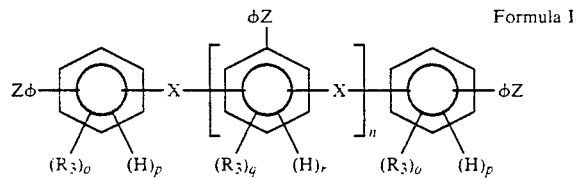

Formula I wherein $R_3$, n, q, r, o, p, X and Z are as described above.

In the structure of Formula I, $R_3$ is a substituent other than hydrogen. Illustrative of suitable $R_3$ groups are such inert substituents as halogen, trihalomethyl, alkyl, alkoxy, phenyl and the like. Suitable $R_3$ substituents also include reactive substituents as for example substituents which may become involved in crosslinking reactions such as cyano, cyanate, hydroxy, alkynyloxy, and the like.

In the phenolic cyanate of Formula I, —X— is a divalent organic radical which is substituted to the phenyl moieties at the para position or at the para and ortho Positions or at the meta and para positions or at the meta positions or at the meta and ortho positions with respect to the —Z groups such that the mole percent of ortho substitution is equal to or less than about 76% based on the total number of phenyl groups substituted to the —X— moiety. Illustrative of suitable —X— groups are substituted or unsubstituted alkylene such as methylene, ethylemthylene, 2-ethylpentylmethylene, methylmethylene, isopropylmethylene, isobutylmethylene, pentylmethylene, and furylmethylene, perfluoromethylene, perchloromethylene and the like; substituted and unsubstituted arylenes such as 1,3-benzenedimethylene, phenylmethylene, 1,4-benzenedimethylene; 2,2-bis-(4-phenylene)propane, 4-methoxyphenyl-methylene, bis-(4-phenylene)methane, 1,3-(4-chloro-benzene)dimethylene), 4,4-diphenylene dimethylethane; and cycloalkylenes such as cyclohexylene, cyclooctylene, and 1,3-cyclohexanedimethylene, and the like.

Z is —O—(R)$_y$—CN or —OH and —O—(R)$_y$—CN. Useful —R— functions include divalent organic radicals selected from the group consisting of (a) divalent aromatic hydrocarbon radicals having from about 6 to about 20 carbon atoms and halogenated derivatives thereof, (b) divalent alkylene radicals and cycloalkylene radicals having from about 2 to about 20 carbon atoms, and (c) divalent polydiorganosiloxanes terminated with alkylene having from about 2 to about 8 carbon atoms.

Preferred for use in the practice of this invention are those embodiments in which:

—Z is the same or different at each occurrence and is —O—(R)$_y$—CN or —OH and —O—(R)$_y$—CN where from about 20 to about 100 mole percent of the Z moieties are —O—(R)$_y$—CN;

y is the same or different at each occurrence and is 0 or 1 and is preferably 0;

—X— is substituted to the phenyl group at the ortho and para positions with respect to the —Z group of the phenyl moiety and is the same or different at each occurrence and is substituted or unsubstituted methylene or aryldialkylene, wherein permissible substituents are benzene, halogen, alkyl, furfuryl or cycloalkyl, or —X— is a moiety of the formula: —SO$_2$—, —S—, —S—S—, —SO—, —C(O)O—, —O—, —C(O)— or OC(O)—, wherein the mole percent of ortho substitution is from about 75 to about 40 mole percent;

q and r are the same or different at each occurrence and are Positive whole numbers from 0 to 3, with the proviso that the sum of q and r is 3;

—R— is the same or different at each occurrence and is selected from the group consisting of divalent aromatic divalent hydrocarbon radicals having from about 1 to about 20 carbon and halogenated derivatives thereof, and divalent alkylene or cycloalkylene radicals and is preferably alkylene having from 1 to about 10 carbon atoms;

$R_3$ is the same or different at each occurrence and is alkyl, halogen, cyano, hydroxy, cyanate, isocyanate, or alkynyloxy;

n is 0 or a positive number from 1 to about 10; and o and p are the same or different at each occurrence and are positive whole numbers from 0 to 4, with the proviso that the sum of o and p is 4.

Amongst the preferred embodiments, particularly preferred are those embodiments of above Formula I in which:

—Z is the same or different at each occurrence and is —OCN, or —OCN and —OH and with the proviso that from about 50 to about 100 mole percent of Z moieties are —OCN;

—X— is substituted to the phenyl group at the ortho and para positions with respect to the —Z group of the phenyl moiety and is substituted or unsubstituted methylene, wherein permissible substituents are alkyl having from 1 to about 10 carbon atoms, benzene, halogen or furfuryl, xylene,—C(O), —OC(O)— —SO$_2$—, —O—, or —C(O)O— wherein the mole percent of ortho substitution is from about 70 to about 45 mole percent;

$R_3$ is alkyl, halogen, cyano, alkynylene, cyanato, alkoxy, or alkynyloxy preferably alkyl such as methyl or ethyl;

o is 0 or 1;

p is 0 or 1;

n is from about 1 to about 10, and more preferably from about 1 to about 8;

q is 0 or 1 r is 2 or 3; and p is 3 or 4.

The most preferred embodiments of the invention are those embodiments wherein:

n is 1 to about 5;

—Z is substituted at the ortho and para positions with respect to the —Z moiety of the phenyl moiety and is the same or different at each occurrence and is —OCN or —OH and —OCN with the proviso that from about 80 to about 100 mole percent Z moieties are —OCN;

q is 0;

o is 0; and

—X— is methylene or methylene substituted with alkyl having 1 to about 10 carbon atoms, benzene, halogen or furfuryl, or is a moiety of the formula:

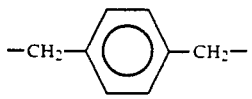

(with those embodiments in which X is methylene being the embodiments of choice) wherein the mole percent of ortho substitution is from about 55 to about 65 mole percent;

r is 3; and p is 4.

The phenolic cyanate resins of this invention exhibit enhanced shelf life. In general, the shelf life of the phenolic cyanate is more than about 3 days. In the preferred embodiments of the invention, the shelf life is at least about 4 days, and in the particularly preferred embodiments, shelf life is at least about 10 days. Amongst these particularly preferred embodiments, most preferred are those embodiments in which the shelf life is from about 10 days to about 90 days.

Surprisingly, we have discovered that mole percent of —X-linking groups substituted ortho with respect to the —Z group has a significant effect on the shelf life of the phenolic cyanate. In general, the lower the mole percent of ortho substitution, the longer the shelf life and the higher the extent of ortho substitution, the shorter the shelf life. The extent of ortho substitution is usually selected such that a shelf life of more than about 3 days results. This usually occurs where the average mole percent of ortho substitution is equal to or less than about 76 mole percent based on the total moles of phenyl groups bonded to —X— linking group. The mole percent of ortho substitution is determined by conventional nuclear magnetic resonance (NMR) techniques.

The cyanato group containing phenolic resin of the present invention results in satisfactory cured phenolic triazine regardless of the number average molecular weight as measured by gel permeation chromatography using tetrahydrofuran as the solvent. In general, materials having lower number average molecular weights (from about 320 to about 900) tend to be liquid and are preferably employed in applications where use of a liquid resin provides the best results, and higher number average molecular weight (from about 900 to about 1700) materials are usually solid and are preferably used in applications where use of a solid precursor resin is preferred. The preferred average molecular weight range is a number average molecular weight of 320 to about 1700.

The phenolic cyanate resin of the invention depicted in Formula I is prepared by a nucleophilic displacement reaction. In the first step of this reaction, a phenolic resin is reacted with a stoichiometric amount or a slight excess of a base to form a basic salt of the Formula III.

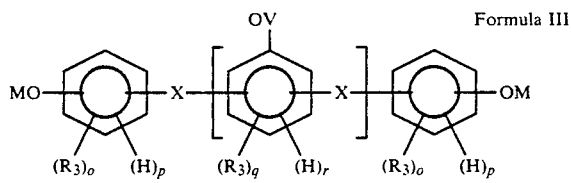

Formula III wherein $R_3$, —X—, O, p, q, r and n are as defined above, M is a cation and V is M or hydrogen, preferably under nitrogen in the presence of an aprotic solvent.

Reaction temperatures can vary widely in the first step. Preferred reaction temperatures are about $-5°$ C., to about $120°$ C. with agitation and more preferably from about $-5°$ C. to about $-45°$ C.

Useful solvents can vary widely. The solvent is inert under the reaction conditions and is preferably an aprotic solvent. Illustration of solvents useful in the conduct of this reaction are methylene chloride, N,N-dimethyl acetamide, N,N-dimethyl formamide, N-methyl-2 pyrrolidone, propyl carbonate, cyclohexane, oxylene, carbon tetrachloride, benzene, and dimethyl sulfoxide, ethers such as diglyme, cyclic ethers and mixtures thereof. The ethers and aprotic haloalkanes are preferred solvents and ethers, especially cyclic ethers are the most preferred solvents. Most preferred cyclic ethers include tetrahydrofuran, 1,4 dioxane, and furan, with tetrahydrofuran being the solvent at choice.

The base employed may vary widely and includes organic bases such as amines and inorganic bases such as alkali metal and alkaline earth metal hydroxides. Preferred bases are amines, especially tertiary amines. Particularly preferred bases are trialkylamines such as triethylamine, tripropylamine and diethylcyclohexyl amine.

Reaction times can vary considerably and will depend upon such factors as the degree of agitation, temperature, time, nature and proportion of reactants and the like. The reaction product can be recovered by conventional means. For example, the phenolic trialkylamine salt can be precipitate by pouring the reaction mixture into a non solvent vehicle. A non solvent vehicle is defined to be a liquid medium in which the phenolic cyanate resin reaction product is insoluble and non-reactive. Preferred non solvent vehicles include alcohols, more preferably organic alcohols such as propanol, butanol, methanol, ethanol, glycol, polyglycol, with isopropanol being most preferred. The product can then be dried in vacuum over for 24 hours.

Any phenolic resin which can provide the desired trialkylammonium salt may be used. The trialkylammonium phenolic resin is preferably derived from a phenolic novolac. Useful phenolic novolac resins are known in the art. Typical and useful phenolic novolac resins are disclosed in U.S. Pat. No. 4,022,755 at column 2 beginning at line 27.

In the second step of the process, the basic salt is reacted with a moiety of the formula $U(R)_y\cdot CN$, where U is halogen to form the cyanato group containing phenolic resin. The reaction is usually conducted at a temperature of below about −5° C., preferably at a temperature from about −5° C. to about −45° C., more preferably from at a temperature of from about −5° C. to about −30° C. and most preferably at a temperature of from about −15° C. to −30° C.

The relative amounts of solvent, base and phenolic resin used should be controlled to control gel time of the cyanato group containing phenolic resin. Concentrations can be measured as a function of the weight percent of the basic salt which could be calculated based on the weight of the base, phenolic resin and solvent. Preferably, the amount of base salt is from about 5 to about 35, more preferably about 10 to about 25, and most preferably from 10 to 20 percent b weight. The preferred concentration can vary depending on the specific solvents and reactants used.

The product can be isolated using conventional procedures. The purification procedures should preferably avoid the use of temperatures in excess of about 0° C. In the more preferred embodiments of the invention, temperatures in excess of about −5° C. are avoided in the isolation and purification of the produce, and in the most preferred embodiments temperatures in excess of about −10° C. are avoided. The use of temperatures in excess of those specified above during the reaction, and processing and isolation step may result in the formation of an inferior product.

The partially cured, completely cured and incompletely cured phenolic triazine resins of this invention are formed by the polycyclotrimerization of the phenolic cyanate resin of Formula I.

By the term "polycyclotrimerization: is meant forming a cyanurate ring system by the chain extension polymerization of three aromatic cyanate groups to form the crosslinked triazine ring system which comprises the following basic repeat unit of the Formula II:

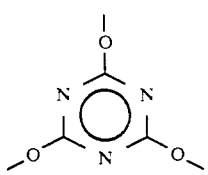

Formula II wherein the open valencies are bonded to a phenyl ring of a phenolic cyanate resin. The methods of conducting the polycyclotrimerization of cyanurate compounds are well known in the art, and include thermal annealing which can be conducted above about 125° C. For example, such methods are described in Kunststoffe, BD, 58pp. 827-832 (1968), by R. Kubens et al. and Polk AK ad Nauk SSSR, vol. 202, pp. 347-350 (1972) by B. B. Korshak et al. and U.S. Pat. No. 4,157,360 which are hereby incorporated by reference.

The cyanato group containing phenolic resins forms a phenolic triazine network upon heating and/or in the presence of a curing agent. The threshold polymerization temperature can vary widely depending on a number of factors, as for example, time, and the presence or lack of a catalyst, the type of catalyst when used, and the like. In general, the threshold polymerization temperature depends on the level of substitution of —O— (R)$_y$CN groups for —OH groups in the original phenolic resin. For example, where all or substantially all of the —OH groups are converted to —O— (R)$_y$CN, and the gel time is greater than 20 minutes at 155° C., the threshold polymerization temperature is usually equal to or greater than about 150° C., and may be equal or greater than 175° C. Threshold polymerization temperature can be measured using a DuPont Model 9900 Differential Scanning Calorimeter. The threshold temperature is indicated by the onset of the curing exotherm. The peak indicates the maximum polymerization temperature. In the preferred embodiments of the invention, the polymerization or curing temperature is from about 100° C. to about 350° C., more preferably from about 100° C. to about 300° C., and most preferably 150° C. to 280° C. Amongst these most preferred embodiments, most preferred are those embodiments in which the polymerization temperature is from about 200° C. to about 250° C.

Useful curing pressures can vary widely. Usually curing pressures are from about 300 to 500 psi for about 5 minutes to 1 hour depending on sample size.

Heating can be accomplished by conventional methods known to those of skill in the art. Illustrative of such methods are heating with an oil bath, vacuum, hot air annealing, compression molding and the like.

The polymerization can be carried out in the presence of a catalytically effective amount of a catalyst. Useful catalyst can vary widely and include anhydrous metal salts such as stannous chloride dihydrate, cuprous bromide, cuprous cyanide, cuprous ferricyanide, zinc chloride, zinc bromide, zinc iodide, zinc cyanide, zinc ferrocyanide, zinc acetate, zinc octate, silver chloride, ferrous chloride, nickel chloride, ferric chloride, cobaltous cyanide, nickel sulfate, stannic chloride, nickel carbonate, and the like. Also useful as catalyst are proton-donating organic reducing agents such as tetrahydropyridine, hydroquinone, 4,4-biphenol and the like, and the catalyst described in U.S. Pat. Nos. 4,528,366 and 4,713,442.

Amounts of the catalyst, when used, can vary widely provide that the amount is sufficient to catalyze the reaction to the desired extent. The conventional catalytically effective amounts of catalyst are employed However, in the preferred embodiments of the invention, the amount of catalyst employed is such that the amount of residual metal is less than about 1000 ppm based on the total parts of resin, preferably less than about 500 ppm, more preferably less than about 100 ppm and most preferably less than about 10 ppm.

A reinforced and/or filled compositions comprising the completely cured, partially cured, and incompletely cured phenolic triazine and/or phenolic cyanate polymers of this invention, as well as the compositions and blends which may be used in the preparation of such reinforced compositions are also part of the invention disclosed herein. The completely cured, precured, partially cured, and incompletely cured compositions as described, may contain fillers for use in where the structural strength and integrity of a structure has to be maintained, and for other purposes known to those of skill in the art. Any suitable filler known to those of skill in the art can be used. Such fillers may be selected from a wide variety of organic and inorganic materials such as polymers, minerals, metals, metal oxides, siliceous materials and metal salts. Illustrative of useful fillers are fiber glass, steel fibers, asbestos fibers, aramide fibers, boron fibers and carbon fibers, as well as plate like, fibrous and particulate forms of alumina, brass powder, aluminum hydrades, iron oxide, feldspar, lead oxides, asbestos, talc, barytes, calcium carbonates, clay, carbon black, quartz, novaculite and other forms of silica, koalinite, aluminum silicate, bentonite, garnet, mica, saponite, beidelite, calcium oxide, and fused silica, calcium hydroxide. Other useful fillers include fibers formed from thermoplastic polymer, as for example, Polyesters, polyolefins, polyimides, polyamides, polyether-etherketones, polysulfones, polyaramids, polyester carbonates, polyethers, polyphenylene sulfide, polybenzaimidazole, polyethersulfones, polycarbonates, polyamides, polyetherimides polysulfides, polyacrylates, and polyvinyls and the like; and thermosetting resins as for example phenolics, allylics, epoxies, alkyds and the like. The foregoing recited fillers are illustrative only and are not meant to limit the scope of the fillers that can be utilized in this invention. Methods for producing reinforced and/or filled compositions include melt blending, extrusion and molding processes, simple mixing and dispersion of both materials in suitable medium by methods known in the art.

This invention also relates to blends of the phenolic triazine polymers and/or phenolic cyanate resin and one or more thermoplastic or thermosetting resins which may optionally include one or more particulate or fibrous fillers. Useful thermoplastic and thermosetting resins and useful fillers include those discussed above.

The phenolic cyanate polymer of this invention, completely cured, incompletely cured and partially-cured compositions of this invention are useful in forming a wide variety of industrial products, including shaped articles, as produced by known shaping processes. The phenolic cyanate polymer of this invention compositions can be formed (i.e., shaped) into articles which can then be cured to form completely cured, incompletely cured and partially-cured articles. Shaped articles produced from the polymer composition include windscreens such as wind shields, structural parts, canopies, door windows, wire housing and the like. The shaping process can be any process known to one skilled in the art, such as resin transfer, injection, blow or extrusion molding, and pultrusion and prepreg processing. Another use of the crosslinked polymer of the member is a binder resin in the manufacture of friction materials such as brake linings, clutch facings and transmission bands, as for example, those described in U.S. Pat. Nos. 3,996,670; 4,268,657; or 4,281,361. Still other uses of the copolymers of this invention are molding materials, and composites for use in the manufacture of structural parts. Yet other copolymers of this invention are useful as adhesives.

In order that those skilled in the art will be better able to practice the invention, the following examples are give by way of illustration and not by way of limitation. In the examples, all parts are by weight unless otherwise noted.

COMPARATIVE EXAMPLE 1

A mixture of 102 g of high ortho novolac (ortho:para 76:14) 633 number average molecular weight) 106 g triethylamine was dissolved in 1L of tetrahydrofuran at ambient temperature. A 120 g of cyanogen bromide was dissolved in 0.5L of tetrahydrofuran under a nitrogen atmosphere. The solution containing the trialkyllammonium salt of novolac was added to the cyanogen bromide solution over a period of 1 hr. During the addition, the temperature of reaction mixture was maintained at $-60°$ C. After the reaction was completed, the mixture was allowed to stand for an additional one hour to bring the temperature of reaction mixture to $+10°$ C. The product was isolated by filtration through silica gel to remove the trialkylammonium salt. The filtrate was purified by precipitation in an isopropanol/dry ice mixture ($-15°$ C. to $-20°$ C.) twice and subsequently dried in a vacuum oven over night to produce off-white cyanated phenolic resin. The IR Spectrum indicated strong absorption at 2220 $CM^{-1}$ ($-C\equiv N$). GC analysis showed no diethylcyanamide. Gel time of product at 155° C. is 3 minutes.

EXAMPLE 1

Comparative Example 1 was repeated except that the novolac used had the following characteristics:

The number average molecular weight (GPC) was 820.

Ortho/para ratio was 60/40.

Gel time of the cyanated novolac product at 155 ° C. was 30 minutes.

Number average molecular weight ($M_n$) of the cyanated product was 1650.

EXAMPLE 2

Comparative Example 1 was repeated except that the novolac used had the following characteristics:

The number average molecular weight (GPC) was 455.

Ortho/para ratio was 59/41.

The number average molecular weight of the cyanated product was 1,183.

Gel time of the cyanated novolac at 155° C. was 2 hrs.

EXAMPLE 3

A mixture of 102 g of novolac (ortho/para ratio of 59/41) and number average molecular weight of 360 and 106 g of triethylamine were dissolved in 250 ml of methylene chloride at ambient temperature to form a triethylammonium salt of the novolac. Cyanogen bromide (120g) was dissolved in 350 ml of methylene chloride. The solution containing the triethylammonium salt of novolac was added slowly to the solution of cyanogen bromide. During the addition, the temperature of the reaction mixture was maintained at $-30°$ C. to 50° C. After the addition of salt solution was completed, the reaction mixture was stirred for additional 15 minutes and product was isolated by filtration to remove triethylammonium hydrobromide salt. The cyanated phenolic was purified by extraction with water. The methylene chloride was removed with a rotary evaporator at 50° C. under reduced pressure. A viscous liquid resulted. The gel time for the product at 200° C. is 20 minutes and at 155° C. is 2 hrs, and the number average molecular weight of the cyanated product (GPC) was 550.

COMPARATIVE EXAMPLE 2

A series of experiments were carried out to evaluate the shelf life of each of the compositions of this invention whose Preparations are described in Examples 1, 2, and 3 and to compare same to the shelf life of the composition whose preparation is described in Comparative Example 1. In these experiments, the shelf of the composition was determined by storing same at room temperature (about 20° C.) to determine the number of days necessary for the formation of 20 wt % of materials based on the total weight of the composition) which were insoluble in several organic solvents. The results of these studies are set forth in the following Table I.

TABLE I

| Exp. No. | Solvent | Ex 1 | Ex 2 | Ex 3 | Comp Ex 1 |
|---|---|---|---|---|---|
| (1) | Acetone | 3 mos | 1 yr | 1 yr | 2 wks |
| (2) | Methylene Chloride | 3 mos | 1 yr | 1 yr | 2 wks |
| (3) | Methyl Ethyl Ketone | 3 mos | 1 yr | 1 yr | 2 wks |

COMPARATIVE EXAMPLE 3

Measurements were made to determine the gel time of the cyanato containing phenolic resins produced by Examples 1 to 3 of the present invention as well as that of Comparative Example 1. The samples were tested for gel time using the following procedure:

Apparatus

1. Stop watch.
2. 0°–250° C. thermometer.
3. Electric hot plate, adjusted to 155° C. ±1° C. and enclosed in a wind shield.
4. 4" spatula

Method

1 For Powdered resins: Weigh out a 1.0 gram sample on a watch glass.

2. Quickly dump the complete sample on the center surface of the hot plate and at the same time start the stop watch.

3 Using a 4" spatula spread the resin over a 2 inch square area in the center of the hot plate and stroke the entire area with the spatula at a rate approximating 80 strokes per minute. Without stopping the watch, note the time it took for the resin to melt.

4. Continue stroking, keeping the blade of the spatula close to the surface of the resin, until the resin has passed through a stringy stage and suddenly seems hard and glazed and offers little or no resistance to stroking with the spatula. This end point is best determined only after considerable practice to get the "feel" of the resin as it "lets go" at its gel point.

5. Record number of seconds to melt and number of seconds for gel time (cure time). Subsequent checks on the same sample should agree within ±5 seconds.

Smoke generation was a visual observation during testing of gel time. The percent diethyl cyanamide was measured by Gel Permeation Chromatography (GPC). The results are summarized in Table II.

TABLE II

| Sample 1 | Gel Time (min) | Smoke | Diethyl Cyanamide wt % by GC |
|---|---|---|---|
| Example 1 | 30 | NO SMOKE | TRACE |
| Example 2 | 120 | NO SMOKE | TRACE |
| Example 3 | 120 | NO SMOKE | TRACE |
| Comp. Ex. 1 | 3 | NO SMOKE | TRACE |

What is claimed is:

1. A phenolic cyanate resin of the formula:

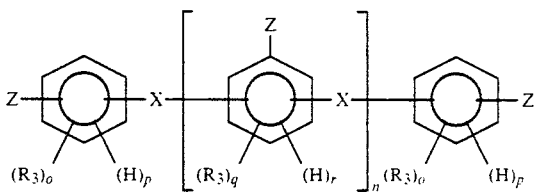

wherein:
q and r are the same or different and are whole numbers from 0 to 3 with the proviso that the sum of q and r at each occurrence is equal to 3;

Z is —O(R)$_y$CN, or —OH and —O(R)$_y$CN;

y is 0 or 1; O and p are the same or different at each occurrence and are positive whole numbers from 0 to 4, with the proviso that the sum of O and p is equal to 4;

—X— is a divalent radical which is substituted to the phenyl groups at the para positions, meta positions, ortho and meta positions, para and ortho positions or para and meta positions with respect to the —Z group such that the mole percent of —X— substituted at the ortho position is less than about 76 mole percent based on the total number of phenyl groups substituted to the —X— moiety;

—R— is divalent radical;

R$_3$ is the same or different at each occurrence and is a substituent other than hydrogen; and n is 0 or a positive whole number greater than or equal to 1 wherein on maintaining a 20 gram sample of said resin at a temperature of about 20° C. for more than about 3 days no more than about 20% by weight of said sample is converted into components which are insoluble in a 100 gram sample of tetrahydrofuran at a temperature of about 20° C.

2. A resin according to claim 1, wherein —X— is substituted to the phenyl groups at the para and ortho positions.

3. A resin according to claim 2, wherein y is 0.

4. A resin according to claim 3 wherein said mole percent is equal to or less than about 75.

5. A resin according to claim 4 wherein said mole percent is from about 40 to about 75.

6. A resin according to claim 5 wherein said mole percent is from about 45 to about 70.

7. A resin according to claim 6 wherein said mole percent is from about 55 to about 65.

8. A resin according to claim 3 wherein on maintaining a 20 gram sample of said resin at a temperature of about 20° C. for a period of more than or about 14 days no more than about 20% by weight of said sample is converted into components which are insoluble in a 100 gram sample of tetrahydrofuran at a temperature of about 20° C.

9. A resin according to claim 8 wherein on maintaining a 20 gram sample of said resin at a temperature of about 20° C. for a period of up to about 21 days no more than about 20% by weight of said sample is converted into components which are insoluble in a 100 gram sample of tetrahydrofuran at a temperature of about 20° C.

10. A resin according to claim 8 wherein on maintaining a 20 gram sample of said resin at a temperature of about 20° C. for a period of more than or about 90 days no more than about 20% by weight of said sample is converted into components which are insoluble in a 100 gram sample of tetrahydrofuran at a temperature of about 20° C.

11. A resin according to claim 9. having a gel time of greater than 3 minutes at 155° C. and no or substantially no volatiles generated during gel times measurements.

12. A resin of claim 11 wherein gel time is equal to or greater than 10 minutes.

13. A resin of claim 12 wherein the gel time is equal to or greater than 20 minutes.

14. A phenolic triazine resin derived from the cyanato group containing phenolic resin recited in claim 1.

15. A resin according to claim 3 wherein from about 20 to about 100 mole percent of Z are —O—(R)$_{\overline{n}}$CN.

16. A resin according to claim 13 wherein from about 80 to about 100 mole percent of Z are —O—(R)$_{\overline{n}}$CN.

17. A resin according to claim 3 wherein X is substituted at the ortho and para positions with respect to the —Z group of the phenyl moiety and is substituted or unsubstituted methylene or phenyldialkylene, wherein permissible substituents are alkyl groups having from 1 to about 10 carbon atoms, halogen, benzene, or furyl.

18. A resin according to claim 16 wherein X is the same or different and is substantiated or unsubstituted methylene or phenyldialkylene wherein permissible substituents are alkyl groups having from 1 to 10 carbon atoms, benzene, halogen or furfuryl, or X is a a moiety of the formula:

—O—, —SO$_2$—, —S—, —S—S—, —C(O)—, —C(O)O— or —OC(O)—.

19. A resin according to claim 18 wherein —X— is unsubstituted methylene or methylene substituted with one or more alkyl having 1 to about 10 carbon atoms, benzene, halogen and furyl, or is a moiety of the formula:

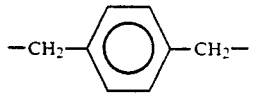

20. A resin according to claim 19 where —X— is unsubstituted methylene or methylene substituted with alkyl, benzene or furyl.

21. A resin according to claim 20 wherein —X— is methylene.

22. A resin according to claim 21 wherein n is from 1 to about 10, wherein the number average molecular weight of said resin is from about 320 to about 1700.

23. A resin according to claim 22 wherein n is from 1 to about 8.

24. A resin according to claim 22 wherein n is from 1 to about 5.

25. A resin according to claim 3 wherein:
o is 0 or 1; and
p is 2 to 4.

26. A resin according to claim 3 wherein:
q is 0 or 1; and
r is 2 to 3.

27. A resin according to claim 22 wherein R$_3$ is alkyl.

28. A resin according to claim 27 wherein o and q are the same or different at each occurrence and are 0 or 1, p is 3 or 4 and r is 2 or 3.

29. A completely cured composition formed by cyclotrimerization of the composition of claim 3.

30. A partially cured composition formed by cyclotrimerization of the composition of claim 3.

31. An incompletely cured composition formed by cyclotrimerization of the composition of claim 3.

32. A resin according to claim 3 containing one or more fillers.

33. A resin blend comprising one or more cyanate resins of claim 3 and one or more thermoplastic or thermosetting resins.

34. A resin blend according to claim 33 comprising one or more fillers.

35. A resin according to claim 3 which when completely cured forms a phenolic triazine which exhibits a thermal decomposition temperature of at least about 400° C.

36. A resin according to claim 35 wherein said temperature is at least about 450° C.

37. A resin according to claim 28 wherein R$_3$ is alkyl.

38. A resin according to claim 37 wherein R$_3$ is methyl.

39. A resin according to claim 22 or 36 wherein:
q and o are 0;
p is 4; and
r is 3.

40. A resin according to claim 39 wherein said number average molecular weight is from about 320 to about 900.

41. A resin according to claim 39 wherein said number average molecular weight is from about 900 to about 1700.

42. Phenolic triazine derived from the cyanato group containing phenolic resin of claim 39.

43. A resin according to claim 39 further comprising one or more fillers.

44. A resin blend comprising one or more cyanate resins of claim 40 and one or more thermoplastic resins, thermosetting resins or a combination thereof.

45. A resin blend according to claim 44 which further comprises one or more fillers.

* * * * *